(No Model.)
A. RUTH.
ART OF MANUFACTURING CORN COB PIPES.
No. 401,464. Patented Apr. 16, 1889.
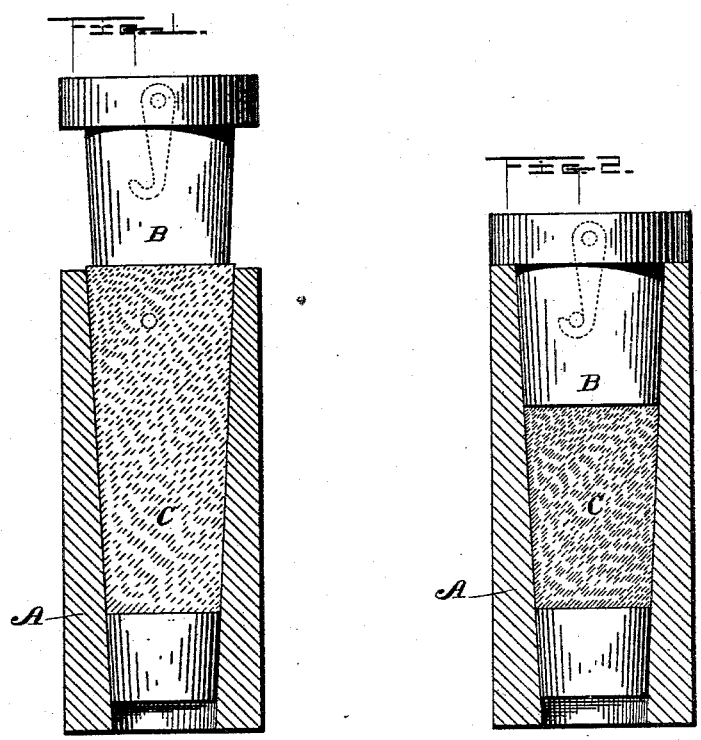
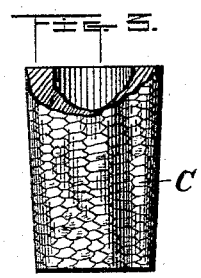

UNITED STATES PATENT OFFICE.

AUGUST RUTH, OF ST. LOUIS, MISSOURI.

ART OF MANUFACTURING CORN-COB PIPES.

SPECIFICATION forming part of Letters Patent No. 401,464, dated April 16, 1889.

Application filed August 15, 1888. Serial No. 282,770. (No model.)

*To all whom it may concern:*

Be it known that I, AUGUST RUTH, of St. Louis, in the State of Missouri, have invented certain new and useful Improvements in the Art of Manufacturing Corn-Cob Pipes; and I do hereby declare the following to be a full, clear, and exact description of the invention, such as will enable others skilled in the art to which it appertains to make and use the same.

My invention relates to an improvement in the art of manufacturing corn-cob pipes.

The object is to utilize slender corn-cobs, which in their natural state would not admit of boring and trimming sufficient to form a receptacle for the tobacco, of a desirable size, and at the same time leave a wall of suitable thickness, and to provide a pipe-bowl, whether formed of the stouter or more slender corn-cob, which shall have a compact durable wall, and which shall retain the desirable qualities of the corn-cob pipe in its natural state.

With these ends in view my invention consists in first treating the corn-cob to render it pliable, then compressing it to render the wall thick and compact, and subsequently boring it to form a pipe-bowl.

In the accompanying drawings, Figure 1 represents a mold with the corn-cob therein as it appears when about to be compressed. Fig. 2 represents the mold with the follower forced home and the corn-cob therein in its compressed state, and Fig. 3 is a view of the bowl complete.

The corn-cob is first rendered pliable, preferably by boiling it in water. It is found that the slight amount of gum which is inherent in the cob is sufficient to render the walls solid and hold them in their compressed state when the cob is allowed to remain a short time under pressure and has become dry. If desired, however, a slight quantity of silicate of soda may be dissolved in the water to render the walls harder when finished; but such treatment is not found necessary, and the boiling in water alone is found to produce a very desirable consistency of material. The cob, when pliable, is placed in the mold A, in practice in pieces C, about four inches in length, and the follower B is then forced home, compressing the cob C into the size and form of the pipe-bowl, as shown in Fig. 3. The compressed cob is then allowed to "set," the time required for the same depending upon the degree of heat to which it may be subjected and ranging in practice from one to four hours or thereabout. The compressed cob is then removed from the mold and bored out to form the bowl, as represented in Fig. 3. The compactness of the wall after the cob is compressed will cause the wall which surrounds the bore to be hard and even, and there will be no tendency of the cob to split while being bored. The outside of the cob, when compressed, will also be hard and even, and may or may not be further trimmed, as desired.

Having thus fully described my invention, what I claim as new, and desire to secure by Letters Patent, is—

1. The improvement in the art of manufacturing corn-cob pipes, consisting in treating the corn-cob to render it pliable, then compressing it, and subsequently boring it to form a pipe-bowl.

2. The improvement in the art of manufacturing corn-cob pipes, consisting in, first, boiling a corn-cob to render it pliable; second, compressing it in a mold, and subsequently boring the compressed cob to form the pipe-bowl.

In testimony whereof I have signed this specification in the presence of two subscribing witnesses.

AUGUST RUTH.

Witnesses:
L. A. BATTICH,
A. B. LANSING, Jr.